United States Patent [19]
Tomono et al.

[11] Patent Number: 5,377,044
[45] Date of Patent: Dec. 27, 1994

[54] REFLECTING DIFFRACTION GRATING AND DEVICE, SUCH AS ENCODER OR THE LIKE, USING THE SAME

[75] Inventors: Haruo Tomono, Machida; Yuji Matsuo, Yokohama, both of Japan

[73] Assignee: Canon Kabushiki Kaisha, Tokyo, Japan

[21] Appl. No.: 197,556

[22] Filed: Feb. 17, 1994

Related U.S. Application Data

[63] Continuation of Ser. No. 124,562, Sep. 22, 1993, abandoned, which is a continuation of Ser. No. 41,343, Apr. 1, 1993, abandoned, which is a continuation of Ser. No. 666,610, Mar. 8, 1991, abandoned.

[30] Foreign Application Priority Data

Mar. 19, 1990 [JP] Japan ................................ 2-70940
Jan. 31, 1991 [JP] Japan ................................ 3-011004

[51] Int. Cl.$^5$ ............................ G02B 1/10; G02B 5/18; G02B 27/44
[52] U.S. Cl. ................................ 359/566; 250/231.16; 359/572; 359/576
[58] Field of Search ............... 359/568, 572, 576, 566, 359/569; 351/166; 250/231.16, 201.4; 369/45

[56] References Cited

U.S. PATENT DOCUMENTS

| | | | |
|---|---|---|---|
| 2,904,405 | 9/1959 | Irland et al. | 351/166 |
| 3,811,753 | 5/1974 | Onoki et al. | 351/166 |
| 4,155,627 | 5/1979 | Gale et al. | 359/568 |
| 4,484,072 | 11/1984 | Matsumura | 359/572 |
| 4,531,809 | 7/1985 | Carter et al. | 359/572 |
| 4,576,439 | 3/1986 | Gale et al. | 359/572 |
| 4,753,513 | 6/1988 | Shikama | 359/566 |
| 4,842,633 | 6/1989 | Kuribayashi et al. | 359/900 |
| 4,842,969 | 6/1989 | Kawatsuki et al. | 359/571 |
| 4,846,552 | 7/1989 | Veldkamp et al. | 359/572 |
| 4,856,857 | 8/1989 | Takeuchi et al. | |
| 4,929,822 | 5/1990 | Nakamura et al. | 250/201.4 |
| 4,992,385 | 2/1991 | Godfrey | 359/576 |
| 5,080,465 | 1/1992 | Laude | 359/571 |

FOREIGN PATENT DOCUMENTS 61-39289  11/1986  Japan .

OTHER PUBLICATIONS

"Filmed Surfaces for Reflecting Optics" by Hass, Journal of the Optical Society of America, vol. 45, No. 11, Nov. 1955, pp. 945–952.

*Primary Examiner*—Martin Lerner
*Attorney, Agent, or Firm*—Fitzpatrick, Cella, Harper & Scinto

[57] ABSTRACT

A reflecting diffraction grating is formed by depositing a metal in vacuum on a blazed diffraction grating having a cross section of regular projections and recesses to provide a metal reflecting film, and forming an SiO protective film on the reflecting film by vacuum deposition.

35 Claims, 6 Drawing Sheets

REFLECTING DIFFRACTION GRATING AND DEVICE, SUCH AS ENCODER OR THE LIKE, USING THE SAME

This application is a continuation of application Ser. No. 08/124,562 filed Sep. 22, 1993, now abandoned, which is a continuation of patent application Ser. No. 08/041,343 filed Apr. 1, 1993, abandoned, which is a continuation of patent application Ser. No. 07/666,610, filed Mar. 8, 1991, abandoned.

1. Field of the Invention

This invention relates to a reflecting diffraction grating which may be used in a device, such as an encoder, a color image scanner or the like.

2. Description of the Prior Art

In a conventional scale for an encoder, for example, the scale disclosed in Japanese Utility Model Application Publication No. 61-39289 (1986), periodic grooves are formed on a glass substrate using a photoresist to provide a blazed diffraction grating, and a reflecting film formed from Al or the like is deposited in vacuum on the surface of the grooves to provide an optical scale. FIG. 10 is a cross-sectional view of a conventional example of such a scale. In FIG. 10, there are shown a transparent substrate 1, such as a glass substrate or the like, a resin pattern 2 comprising projections and recesses formed by a resist process or the like, and a metal reflecting film 3 formed from Cu, Al or the like.

When the material for such a relief-type diffraction rating pattern comprising regular projections and recesses is a resin, if a metallic reflecting film formed from Al or the like is provided on the surface of the resin, a difference in thermal expansion and contraction between the resin and the metal film occurs when the scale is subjected to a temperature change due to a difference in the coefficient of thermal expansion between the resin and the metal film. This thermal expansion coefficient difference frequently causes film peeling and cracks in the film. Such problems are directly related to a deterioration in optical characteristics of the scale.

Particularly when such a scale is used as a scale for a linear encoder, since the diffraction grating pattern length is designed to be as long as a few inches, cracks are generated in the reflecting film if an environmental durability test (for example, 70° C., 85% RH and 250 hours) is performed, and satisfactory performance cannot be obtained. The cracks can be considered as caused by a great difference in expansion and contraction between the resin and the reflecting film due to the long pattern length.

Furthermore, when the scale is used in a linear encoder, the scale is in most cases singly mounted on an apparatus, such as an X-Y table or the like. At that time, an object often contacts projections and recesses of the scale and damages the reflecting film, causing another problem.

SUMMARY OF THE INVENTION

It is an object of the present invention to provide a reliable reflecting binary or blazed diffraction grating, and a method of producing the same.

It is another object of the present invention to provide an apparatus, for example, a displacement detector, such as an encoder, a speedometer or the like, or a color image reading apparatus, using the above-described diffraction grating.

The invention is directed to a reflecting diffraction grating having a substrate with regular projections and recesses and a reflecting film overlaying the substrate. A protective film covers the overlaying reflecting film.

DETAILED DESCRIPTION OF THE PREFERRED EMBODIMENTS

Preferred embodiments of the present invention will now be explained in detail with reference to the drawings.

Figure 1:
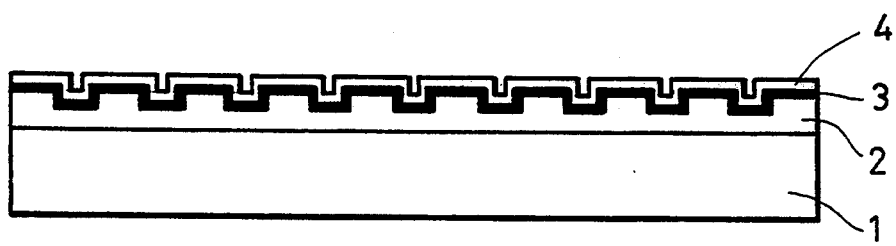
FIG. 1 is a cross-sectional view of a reflecting diffraction grating according to an embodiment of the present invention.

FIG. 1 is a cross-sectional view of a reflecting binary diffraction grating according to an embodiment of the present invention. In FIG. 1, there are shown a transparent substrate 1 made of glass or the like, a thin relief-type resin pattern layer 2 having fine regular projections and recesses, a light-reflecting film 3 formed from a metal, such as Cu, Al or the like, and an SiO film 4 overcoated on the light-reflecting film 3 by vacuum deposition.

The substrate 1 is made of a material which is transparent to illuminating light when the grating is used as a scale for an encoder. For example, optical glass, a plastic material which has a high transparency, or the like may be used as the substrate 1. Preferably, quartz glass or ceramic-type glass which has a low coefficient of thermal expansion may be used. The substrate 1 having a thickness of about 1-3 mm may be easily produced with low cost and high precision.

The resin pattern layer 2 having projections and recesses is made of a polymerization-curing-type resin, for example, an acrylic resin, such as epoxy acrylate, urethane acrylate, polyester acrylate or the like, an epoxy-type resin, a silicone-type resin or the like. The layer 2 is optically transparent, and is formed using a mold having a reversed pattern of projections and recesses. It is satisfactory if the resin layer 2 has a minimum thickness necessary for projections and recesses to satisfy optical performance as an encoder. The thickness of the resin layer 2 is usually in the order of 0.1 $\mu$m–50 $\mu$m.

It is desirable that the reflecting film 3 is formed from a metal having a high reflectivity which can be provided in the form of a thin film by vacuum deposition, such as Cu, Al, Ag, Cr or the like. The thickness of the reflecting film 3 may be about several hundreds—several thousands of Å, and more preferably, 500 Å–4000 Å. If the thickness is less than 500 Å, the reflectivity of the film may be insufficient. If the thickness is more than 4000 Å, the color of the film may change, causing abnormalities in reflected wavelengths.

The thickness of the SiO film 4 may be about several thousands of Å, and more preferably, 1000 Å–5000 Å. If the thickness of the film is less than 1000 Å, the strength of the film is weak, and it is difficult to prevent cracks in the film. If the thickness of the film is more than 5000 Å, the stress in the SiO film itself is too large, possibly generating cracks in the SiO film.

The particular feature of the diffraction grating according to the present embodiment compared with the conventional grating resides in the SiO film provided on the surface of the grating. By overcoating with the SiO film, peeling, cracks and the like of the light-reflecting film are prevented. It is considered that the prevention of cracks of the SiO film is due to the following reasons. That is, an investigation on the strength and fragility of vacuum-deposited films indicates that vacuum-deposited films of metal, such as Cu or Al, are in general weak and fragile when deposited on the surface of a resin. To the contrary, $SiO_2$ and SiO films which are vitreous are tough and hardly generate cracks. In order to reinforce a metal film, an $SiO_2$ film may be deposited in vacuum thereon. The reinforcing effect in that case, however, is small because of insufficient adhesion between $SiO_2$ and metal. To the contrary, an SiO film has a great reinforcing effect, since SiO has unbonded portions, and the portions having a property close to that of metal have a role in strengthening bonding with the reflecting film formed from a metal, such as Cu, Al or the like, in the initial stage of film formation.

The technique of forming an SiO protective film on a mirror surface formed from a metal, such as Al or the like, has been known. The technique is described, for example, in the Journal of the Optical Society of America, Vol. 45, No. 11, pp. 945-952 (1955). In the present invention, a diffraction grating having projections and recesses is used in place of a mirror surface. In the diffraction grating having projections and recesses used in the present invention, a metal reflecting film is first formed by vacuum deposition, and SiO is then overcoated thereon by vacuum deposition in a low or medium vacuum range. Since SiO is well deposited even on sides of projections and recesses of the diffraction grating, SiO is more suitable for depositing on projections and recesses than other materials (for example, $SiO_2$ and the like) for vacuum deposition. Furthermore, by being oxidized after vacuum deposition, SiO becomes $SiO_x$ to enhance the adhesive property and strengthen the film, providing a peculiar effect to protect sides and edge portions of projections and recesses.

Next, an explanation will be provided of an outline of a method to produce the reflecting binary or diffraction grating having the above-described configuration. The method is shown and in FIG. 22. Specific experimental examples and comparative examples will be described later.

A well-washed transparent glass substrate having high plane accuracy is prepared. If necessary, the surface of the substrate is processed by an adhesion-improving agent, such as a silane coupling agent or the like. Subsequently, a necessary amount of polymerization-curing-type resin is dropped on a mold (made of glass or metal) having a reversed pattern of regular projections and recesses which has previously been produced by photolithography as indicated in step S1 of FIG. 11. The glass substrate is superposed on the resin under a strict control of accuracy in dimensions (step S2 of FIG. 11). If necessary, a mold releasing agent is coated on the mold. Subsequently, the polymerization-curing-type resin in the mold is cured (step S3 of FIG. 11). Although there is a heat-curing method wherein the resin is placed in a furnace, such as an oven or the like, an ultraviolet-curing method wherein the resin is irradiated by ultraviolet light is preferred as the curing method, since curing is performed in a short time, providing excellent efficiency. In this case, it is possible to irradiate the untraviolet light through the transparent substrate. When the resin has been cured, the cured resin is released from the mold (step S4 of FIG. 11). Thus, a resin pattern having regular projections and recesses is provided.

If necessary, the laminate comprising the glass substrate and the resin pattern is prewashed. Subsequently, the metal reflecting surface is deposited on the surface of the resin pattern, and the SiO film is further deposited within a temperature range between room temperature and about 80° C. using a usual vacuum deposition apparatus. Thus, the reflecting diffraction grating of the present embodiment, is provided.

Figure 2:
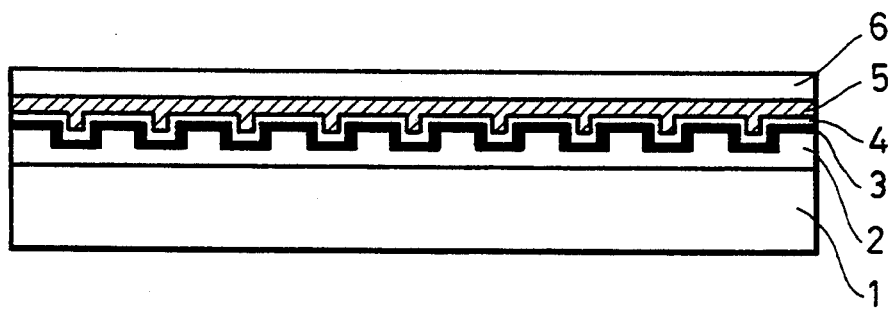
FIG. 2 illustrates a reflecting diffraction grating according to another embodiment of the present invention.

Next, another embodiment wherein the foregoing embodiment is further improved will be explained with reference to FIG. 2. In FIG. 2, like numerals as those in FIG. 1 indicate like components.

In FIG. 2, there are shown an adhesive 5, and a protective substrate 6. Although any conventionally-used adhesive may be used as the adhesive 5, it is preferred to use a silicone-type flexible adhesive having an excellent adhesive property, since strain during bonding and curing processes, and strain due to expansion and contraction caused by temperature changes hardly occur. The adhesive may be as thin as possible.

The protective substrate 6 may be made of glass, metal, plastic or the like which has the thickness and strength to protect projections and recesses when the grating is used as a scale. Particularly preferred are quartz glass, ceramic-type glass and the like, since they are hardly deformed by temperature changes. More preferably, a material having the same coefficient of thermal expansion as that of the reflecting surface side of the substrate may be used.

According to the present embodiment, by laminating the protective substrate on the surface of the SiO film via the adhesive, it is possible to prevent an object from directly contacting the pattern having projections and recesses, and to prevent the reflecting film from being damaged.

Figure 3:
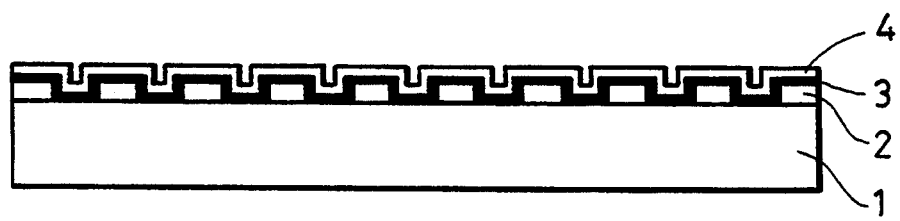
FIG. 3 illustrates a reflecting diffraction grating still another embodiment of the present invention.

FIG. 3 is a cross-sectional view of a grating according to still another embodiment of the present invention. In FIG. 3, a patterned resin 3 comprising projections and recesses is made of a resist. The resin is present only at projected portions, and the resin is absent at recessed portions where the surface of the substrate directly contacts the reflecting film. The resin pattern comprising projections and recesses is formed by photolithography using the resist as the surface of the diffraction grating.

Figure 4:
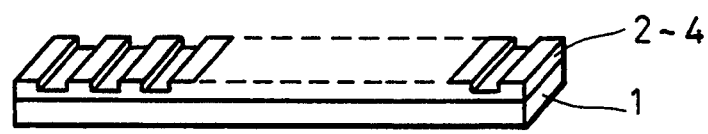
FIG. 4 illustrates an optical scale for a linear encoder.
Figure 5:
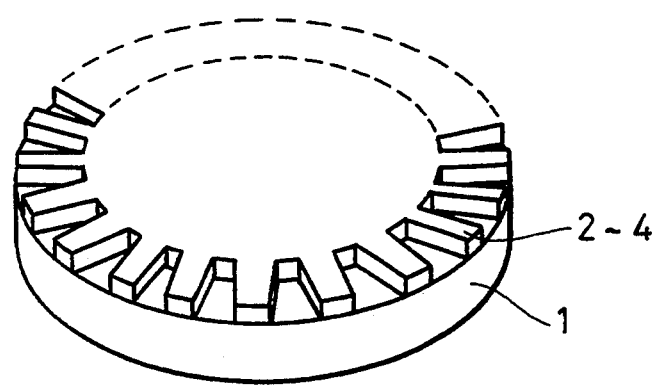
FIG. 5 illustrates an optical scale for a rotary encoder.

An explanation will now be provided of the configuration of an encoder using the above-described reflecting diffraction gratings. The diffraction gratings shown in the foregoing embodiments may be applied to either a scale for a linear encoder as shown in FIG. 4, or a scale for a rotary encoder as shown in FIG. 5.

Figure 6:
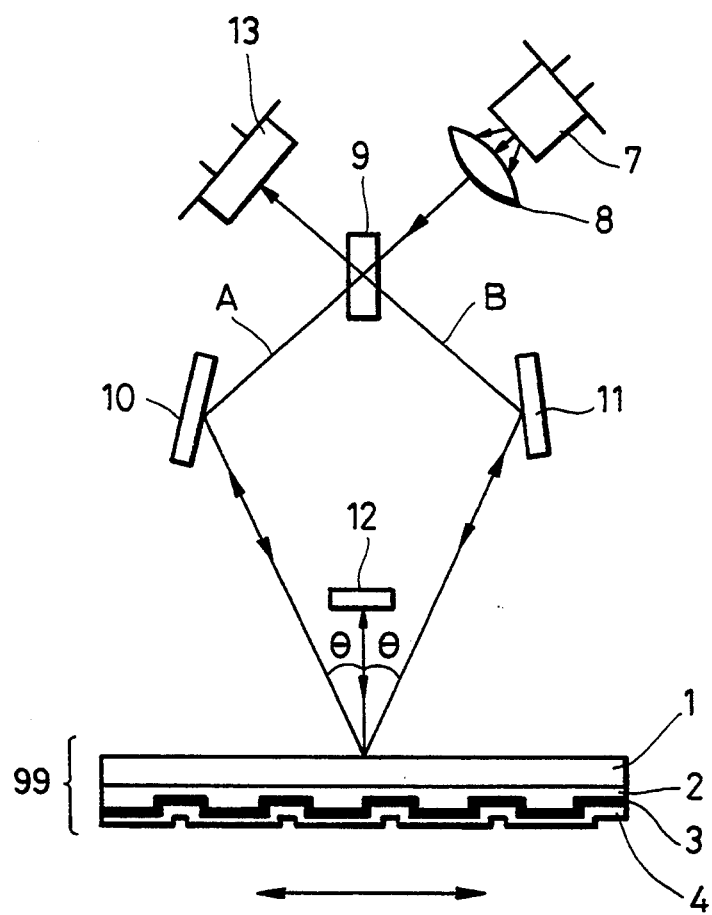
FIG. 6 illustrates the configuration of an encoder using a reflecting diffraction grating.

FIG. 6 illustrates the configuration of a linear or rotary encoder. In FIG. 6, an optical scale 99 includes a reflecting diffraction grating having the above-described structure. There are shown a semiconductor laser 7, a collimating lens 8, a beam splitter 9, reflecting mirrors 10, 11 and 12, and a photosensor 13. The laser light beam emitted from the semiconductor laser 7 becomes a substantially parallel light beam by passing through the collimating lens 8, and is divided into a transmitted light beam A and a reflected light beam B by the beam splitter 9. The transmitted light beam A and the reflected light beam B are collected by the reflecting mirrors 10 and 11 disposed in respective optical paths, and are incident upon the same position on the optical scale 99. At that time, if the incident angle $\theta$ is set to be equal to the generation angle of the 1st-order diffracted light from the diffraction grating, $-$1st-order diffracted light generated by the reflected and refracted light beam A and the $+$1st-order diffracted light generated by the reflected and refracted light beam B are issued in the direction perpendicular to the surface of the substrate (the direction of the normal). The $\pm$1st-order reflected and diffracted light beams are reflected by the reflecting mirror 12, and are directed toward the optical scale 99 to irradiate it again. The $+$1st-order and $-$1st-order rediffracted light beams which are generated again return in the above-described optical paths. The light beams A and B twice subjected to $\pm$1st-order diffraction are superposed in the beam splitter 9, and interfere with each other to form an interfered light beam. The interfered light beam is incident upon the photosensor 13 and subjected to photoelectric conversion. The phases of the $\pm$1st-order diffracted light beams change by $\pm 2\pi$ when the diffraction grating moves one pitch, respectively. Since the interfered light beam generated by the light beams twice subjected to $\pm$1st-order diffraction is incident upon the photosensor 13, four sinusoidal signals are obtained from the photosensor 13 if the diffraction grating moves one pitch. For example, if the pitch of the diffraction grating is assumed to be 1.6 $\mu$m, sinusoidal signals having a period of 0.4 $\mu$m are obtained from the photosensor 13. Thus, according to signals from the photosensor 13, it is possible to measure a relative displacement between the optical scale and the incident light beam.

Although, in FIG. 6, in order to avoid the influence by variations in the thickness of the vacuum-deposited film, the light beams A and B are projected from the surface of the transparent substrate of the optical scale, the light beams may be projected from the surface of the SiO film on the opposite side.

Figure 7:
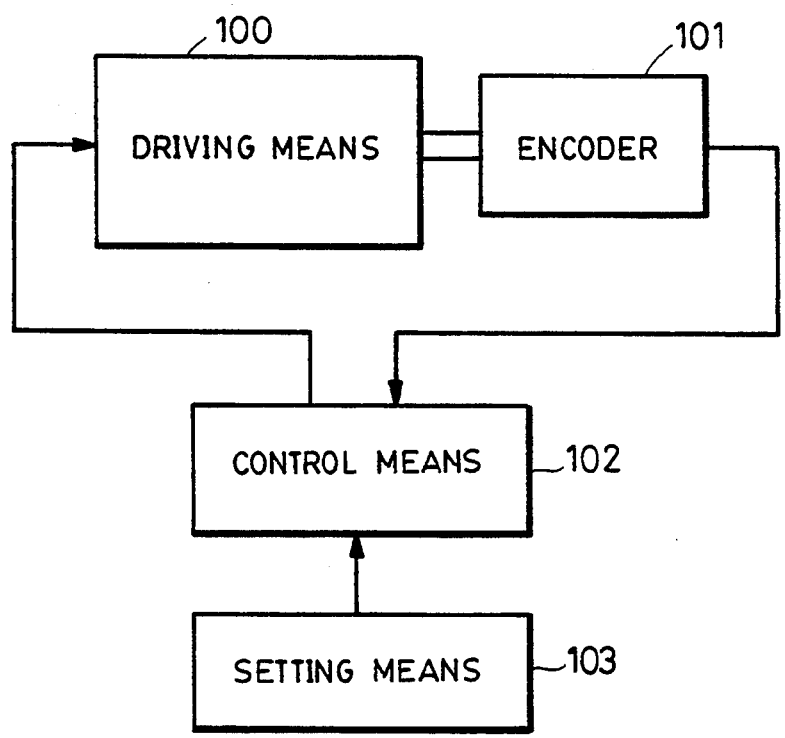
FIG. 7 illustrates the configuration of a driving system including an encoder.

FIG. 7 illustrates an example of the use of the above-described encoder, and shows the configuration of a driving system using the encoder. An encoder 101 is connected to a driving output portion of a driving means 100 having a driving source, such as a motor, an actuator, an internal combustion engine or the like, or to a moving portion of a driven object in order to detect a driving state, such as an amount of rotation, a rotation speed, an amount of movement, a moving speed or the like. The detection output from the encoder 101 is subjected to feedback to a control means 102, which transmits a driving signal to the driving means 100 so as to provide a state set by a setting means 103. By providing such a feedback system, it is possible to obtain a driving state set by the setting means 103. Such a driving system may be widely applied, for example, to machine tools, production machines, measuring apparatuses, recording apparatuses, and also to general apparatuses having driving means.

Figure 8:
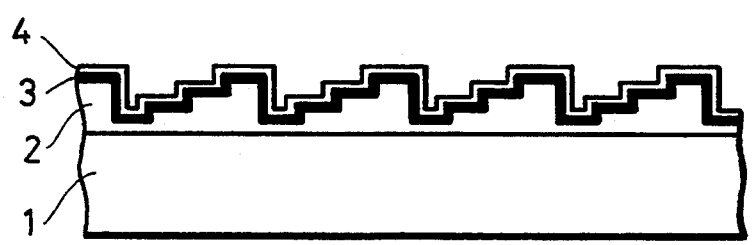
FIG. 8 is a cross-sectional view of a color separation diffraction grating according to still another embodiment.

FIG. 8 illustrates still another embodiment of the present invention, and shows a cross-sectional view of a color separation grating mainly used for a color image reading apparatus or the like. As in the FIG. 1 embodiment, a resin pattern 2 having projections and recesses is provided on a glass substrate 1. A metal, such as Al or the like, is deposited in vacuum on the resin pattern 2, and an SiO layer 4 is overcoated on the metal film by vacuum deposition. The resin pattern 2 has the cross section of one-dimensional regular projections and recesses so as to perform color separation into three primary colors R, G and B by the function of diffraction and to provide a blazed diffraction grating. Also in the present embodiment, the same effect as in the foregoing embodiment can be obtained.

Figure 9:
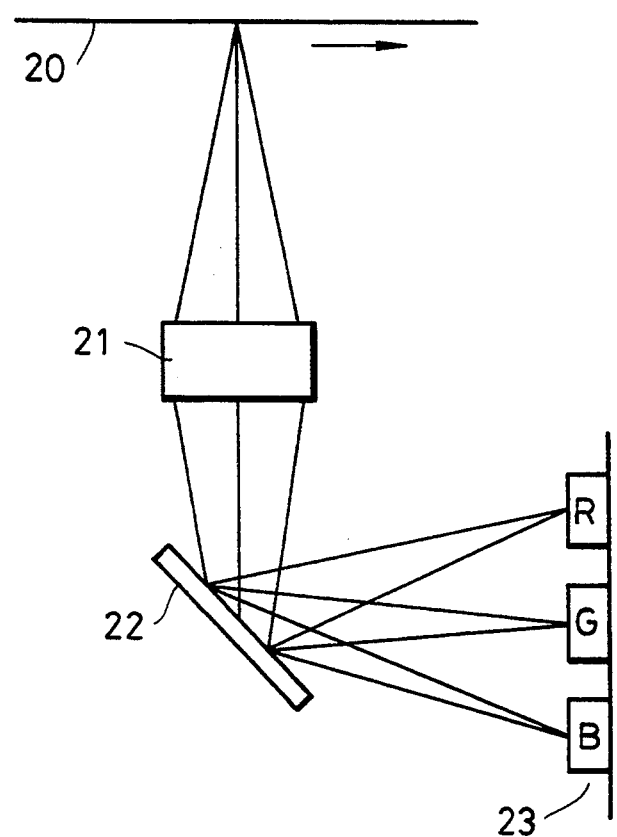
FIG. 9 illustrates the configuration of an optical system of a color image reading apparatus.
Figure 10:
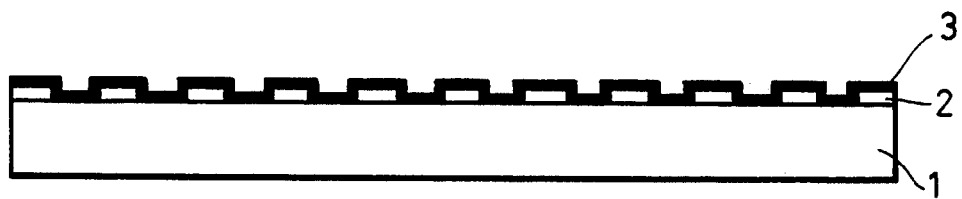
FIG. 10 is a cross-sectional view of a conventional reflecting diffraction grating.

FIG. 9 illustrates a device using such a color separation grating, and shows the configuration of an optical system of a color image reading device which is suitably used for a color copier or a color facsimile. FIG. 9 represents a cross section for subscanning. In FIG. 9, the surface of an original 20 having a color image is movable relative to the following reading optical system in the direction of arrow. A reduction lens 21 constitutes an imaging optical system. A color separation grating 22 is the grating shown in FIG. 8, and is a reflecting one-dimensional binary diffraction grating. A detection means 23 comprises three line sensors for simultaneously detecting respective components of three primary colors subjected to color separation for one line, which are provided in parallel on a substrate. These members 21-23 constitute the reading optical system.

In this configuration, respective components of three primary colors subjected to color separation for one line of the color image original 20 are imaged on the three line sensors by the reduction lens 21. The detection outputs from the respective line sensors are stored in a storage means (not shown). By one-dimensionally scanning the reading optical system relative to the surface of the original 20 in the direction of arrow, it is possible to read the two-dimensional color image. A more detailed explanation is provided in Japanese Patent Application No. 1-319978 (1989).

A description will now be provided of some experimental examples and comparative examples relating to the production of diffraction gratings.

EXPERIMENTAL EXAMPLE 1

A quartz-glass substrate having dimensions of 180$\times$23$\times$3 mm and a plane accuracy of less than five Newton's rings was sufficiently washed. Using a glass mold having projections and recesses of a pitch length of 1.6 $\mu$m and a groove depth of 0.12 $\mu$m, and light-curable urethane acrylate (YK-1 made by Nippon Kayaku Co., Ltd), a resin pattern layer having projections and recesses 20 $\mu$m thick was formed on the quartz-glass substrate by an ultraviolet-cured molding method.

The molded product was then placed in a vacuum deposition apparatus, and a first layer comprising Cu 1500 Å thick and a second layer comprising SiO 2000 Å thick were sequentially deposited in vacuum on the surface of the resin having projections and recesses at a temperature of about 60° C. to provide an optical scale.

EXPERIMENTAL EXAMPLE 2

A first layer comprising Al 1000 Å thick and a second layer comprising SiO 2000 Å thick were deposited in place of the layers in Experimental Example 1 to provide an optical scale, keeping other conditions the same as in Experimental Example 1.

EXPERIMENTAL EXAMPLE 3

A silicone-type adhesive (MOS-10 made by Konishi Co., Ltd) 200 µm thick was coated on the projections and recesses of the optical scale of Experimental Example 1, and a quartz-glass substrate having dimensions of 180×23×1.5 mm was tightly mounted thereon. The two members were bonded together after being cured in an oven at 80° C. for one hour to provide an optical scale having a protective substrate.

COMPARATIVE EXAMPLE 1

Only one layer comprising Cu 1500 Å thick was deposited without providing a second layer in place of the two layers in Experimental Example 1 to provide an optical scale, keeping other conditions the same as in Experimental Example 1.

COMPARATIVE EXAMPLE 2

A first layer comprising Cu 1500 Å thick and a second layer comprising $SiO_2$ 2000 Å thick were deposited in place of the layers of Experimental Example 1 to provide an optical scale, keeping other conditions the same as in Experimental Example 1.

For the optical scales provided in the above-described Experimental Examples 1-3, and Comparative Examples 1 and 2, how cracks were generated in each film was observed, and the values of variations in the 1st-order diffraction efficiency were measured immediately after the production of the scales and after durability tests. The results are shown in the following table.

| Sample | Immediately after the production | | After 70° C., 85% RH and 250 hours | |
|---|---|---|---|---|
| | Cracks | Variations in diffraction efficiency | Cracks | Variations in diffraction efficiency |
| Experimental Example 1 | None | 4.2% | None | 4.3% |
| Experimental Example 2 | None | 4.8% | None | 4.9% |
| Experimental Example 3 | None | 4.8% | None | 5.0% |
| Comparative Example 1 | None | 4.9% | Present | 28.2% |
| Comparative Example 2 | None | 4.5% | Present | 17.9% |

As is apparent from the above-described experiments and comparison, in the reflecting diffraction gratings of the present embodiments, by overcoating not an $SiO_2$ film, but an SiO film on a metal reflecting film comprising Cu, Al or the like, it is possible to prevent peeling, cracks and the like of the reflecting film even after a durability test as well as immediately after the production of the gratings, Furthermore, it is possible to always maintain the diffraction efficiency of equal to or less than 5%.

What is claimed is:

1. A reflecting diffraction grating comprising:
    a glass substrate;
    a resin layer formed on said glass substrate that is substantially thinner than said glass substrate and comprises projections and recesses having a diffraction function;
    a metal reflecting film on the projections and recesses; and
    an SiO film on said metal reflecting film.

2. A reflecting diffraction grating according to claim 1, further comprising:
    a protective substrate adhered on said SiO film by an adhesive.

3. A reflecting diffraction grating according to claim 1, wherein said metal reflecting film is one of Cu, Al, Ag and Cr.

4. A reflecting diffraction grating according to claim 1, wherein said metal reflecting film has a thickness within a range of 1000 Å–5000 Å.

5. A reflecting diffraction grating according to claim 1, wherein said SiO film has a thickness within a range of 500 Å–4000 Å.

6. A reflecting diffraction grating according to claim 1, wherein said reflecting diffraction grating comprises a color separation diffraction grating for color separation.

7. A scale comprising:
    a reflecting diffraction grating including;
    a glass substrate;
    a resin layer formed on said glass substrate that is substantially thinner than said glass substrate and comprises projections and recesses having a diffraction function;
    a metal reflecting film on the projections and recesses; and
    an SiO film on said metal reflecting film.

8. A method of producing a reflecting diffraction grating comprising the steps of:
    preparing a glass substrate;
    forming a resin layer on said glass substrate, which has a configuration of projections and recesses in order to form a diffraction grating and is substantially thinner than said glass substrate;
    depositing a metal in vacuum on said projections and recesses of said diffraction grating to provide a metal reflecting film; and
    forming an SiO film on said metal reflecting film.

9. A method according to claim 8, wherein the method of preparing said substrate comprises the steps of:
    dropping a polymerization-curing-type resin on a mold having a diffraction-grating pattern;
    superposing the glass substrate on the resin from above;
    curing the polymerization-curing-type resin within the mold; and
    releasing the cured resin from the mold.

10. A method according to claim 8, wherein said metal reflecting film is one of Cu, Al, Ag and Cr.

11. A method according to claim 8, wherein said metal reflecting film is deposited in vacuum with a thickness is within a range of 1000 Å–5000 Å.

12. A method according to claim 8, wherein said SiO film is formed with a thickness within a range of 500 Å–4000 Å.

13. An optical apparatus comprising:
    a reflecting diffraction grating; and
    optical means for guiding light onto said diffraction grating,
    said reflecting diffracting grating comprising:

a glass substrate;
a resin layer formed on said glass substrate that is substantially thinner than said glass substrate and comprises projections and recesses having a diffraction function;
a metal reflecting film on said projections and recesses; and
an SiO film on said metal reflecting film.

14. An optical apparatus according to claim 13, further comprising detection means for detecting light from said diffraction grating.

15. An optical apparatus according to claim 13, wherein said diffraction grating is a color separation diffraction grating for color separation.

16. A displacement detector comprising:
a scale comprising a reflecting diffraction grating formed thereon;
illumination means for illuminating a light beam onto said diffraction grating; and
detection means for detecting interfered light formed from reflected and diffracted light from said diffraction grating to measure a relative displacement between said scale and said light beam,
said scale comprising:
a glass substrate;
a resin layer formed on said glass substrate that is substantially thinner than said glass substrate and comprises projections and recesses having a diffraction function;
a metal reflecting film on said projections and recesses; and
an SiO film on said metal reflecting film.

17. A displacement detector according to claim 16, wherein said illumination means includes a laser light source.

18. A displacement detector according to claim 17, wherein said laser light source comprises a semiconductor laser light source.

19. A linear encoder comprising a displacement detector which includes:
a scale with a reflecting diffraction grating formed thereon;
illumination means for illuminating a light beam onto said diffraction grating; and
detection means for detecting interfered light formed from reflected and diffracted light from said diffraction grating to measure a relative displacement between said scale and said light beam,
said scale comprising;
a glass substrate;
a resin layer formed on said glass substrate that is substantially thinner than said glass substrate and comprises projections and recesses having a diffraction function;
a metal reflecting film on said projections and recesses; and
an SiO film on said metal reflecting film.

20. A rotary encoder comprising a displacement detector which includes:
a scale with a reflecting diffraction grating formed thereon;
illumination means for illuminating a light beam onto said diffraction grating; and
detection means for detecting interfered light formed from reflected and diffracted light from said diffraction grating to measure a relative displacement between said scale and said light beam,
said scale comprising:
a glass substrate;
a resin layer formed on said glass substrate that is substantially thinner than said glass substrate and comprising projections and recesses;
a metal reflecting film on said projections and recesses; and
an SiO film on said metal reflecting film.

21. A driving system comprising:
a driving mechanism; and
a displacement detector for detecting a driving state of said driving mechanism,
said displacement detector comprising:
a scale comprising a reflecting diffraction grating;
illumination means for illuminating a light beam onto said diffraction grating; and
detection means for detecting interfered light formed from reflected and diffracted light from said diffraction grating to measure a relative displacement between said scale and said light beam,
said scale comprising:
a glass substrate;
a resin layer formed on said glass substrate that is substantially thinner than said glass substrate and comprises projections and recesses having a diffraction function;
a metal reflecting film on the projections and recesses; and
an SiO film on said metal reflecting film.

22. A driving system according to claim 21, further comprising:
control means for controlling said driving mechanism according to an output from said displacement detector.

23. A reflecting diffraction grating comprising;
a glass substrate;
a resin layer formed on said glass substrate that is substantially thinner than said glass substrate and comprises projections and recesses having a diffraction function;
a metal reflecting film formed on the projections and recesses; and
a film including an oxide of an Si element except $SiO_2$ on said metal reflecting film.

24. A method of producing a reflecting diffraction grating comprising the steps of:
preparing a glass substrate;
forming a resin layer on said glass substrate having projections and recesses to provide a diffraction grating that is substantially thinner than said glass substrate;
depositing a metal on said projections and recesses of said diffraction grating in a vacuum to provide a metal reflecting film; and
forming a film including an oxide of an Si element except $SiO_2$ on said metal reflecting film.

25. A displacement detector comprising:
a scale comprising a reflecting diffraction grating formed thereon;
illumination means for illuminating a light beam onto said diffraction grating; and
detecting means for detecting interfered light formed from reflected and diffracted light from said diffraction grating to measure a relative displacement between said scale and said light beam, said scale comprising:
a glass substrate;
a resin layer formed on said glass substrate that is substantially thinner than said glass substrate and comprises projections and recesses having a diffraction function;
a metal reflecting film formed on said projections and recesses and
a film including an oxide of an Si element except $SiO_2$ on said metal reflecting film.

26. A reflecting diffraction grating comprising:
a glass substrate;
a resin layer formed on said glass substrate that is substantially thinner than said glass substrate and has a configuration of projections and recesses in order to form a diffraction grating;
a metal reflecting film formed along the configuration of said resin layer; and
an SiO film on said metal reflecting film.

27. A reflecting diffraction grating according to claim 26, further comprising:
a protective substrate adhered on the SiO film by an adhesive.

28. A reflecting diffraction grating according to claim 26, wherein said metal reflecting film is one of Cu, Al, Ag and Cr.

29. A reflecting diffraction grating according to claim 26, wherein said metal reflecting film has a thickness within a range of 1000 Å–5000 Å.

30. A reflecting diffraction grating according to claim 26, wherein said SiO film has a thickness within a range of 500 Å–4000 Å.

31. A method of producing a reflecting diffraction grating comprising the steps of:
preparing a glass substrate;
forming a resin layer on said glass substrate that is substantially thinner than said glass substrate and has a configuration of projections and recesses in order to form a diffraction grating;
depositing a metal in vacuum along the configuration of said resin layer to form a metal reflecting film; and
forming an SiO film on said metal reflecting film.

32. A method according to claim 31, wherein the method of preparing said substrate comprises the steps of:
dropping a polymerization-curing-type resin on a mold having a diffraction-grating pattern;
superposing the glass substrate on the resin from above;
curing the polymerization-curing-type resin within the mode; and
releasing the cured resin from the mold.

33. A method according to claim 31, wherein said metal reflecting film is one of Cu, Al, Ag and Cr.

34. A method according to claim 31, wherein said metal reflecting film is deposited in vacuum with a thickness within a range of 1000 Å–5000 Å.

35. A method according to claim 31, wherein said SiO film is formed with a thickness within a range of 500 Å–4000 Å.

* * * * *

UNITED STATES PATENT AND TRADEMARK OFFICE
CERTIFICATE OF CORRECTION

PATENT NO. : 5,377,044
DATED : December 27, 1994
INVENTOR(S) : HARUO TOMONO, ET AL.

It is certified that error appears in the above-identified patent and that said Letters Patent is hereby corrected as shown below:

COLUMN 1

Line 31, "rating" should read --grating--.

COLUMN 2

Line 13, "grating" should read --grating of--.

COLUMN 3

Figure 11:
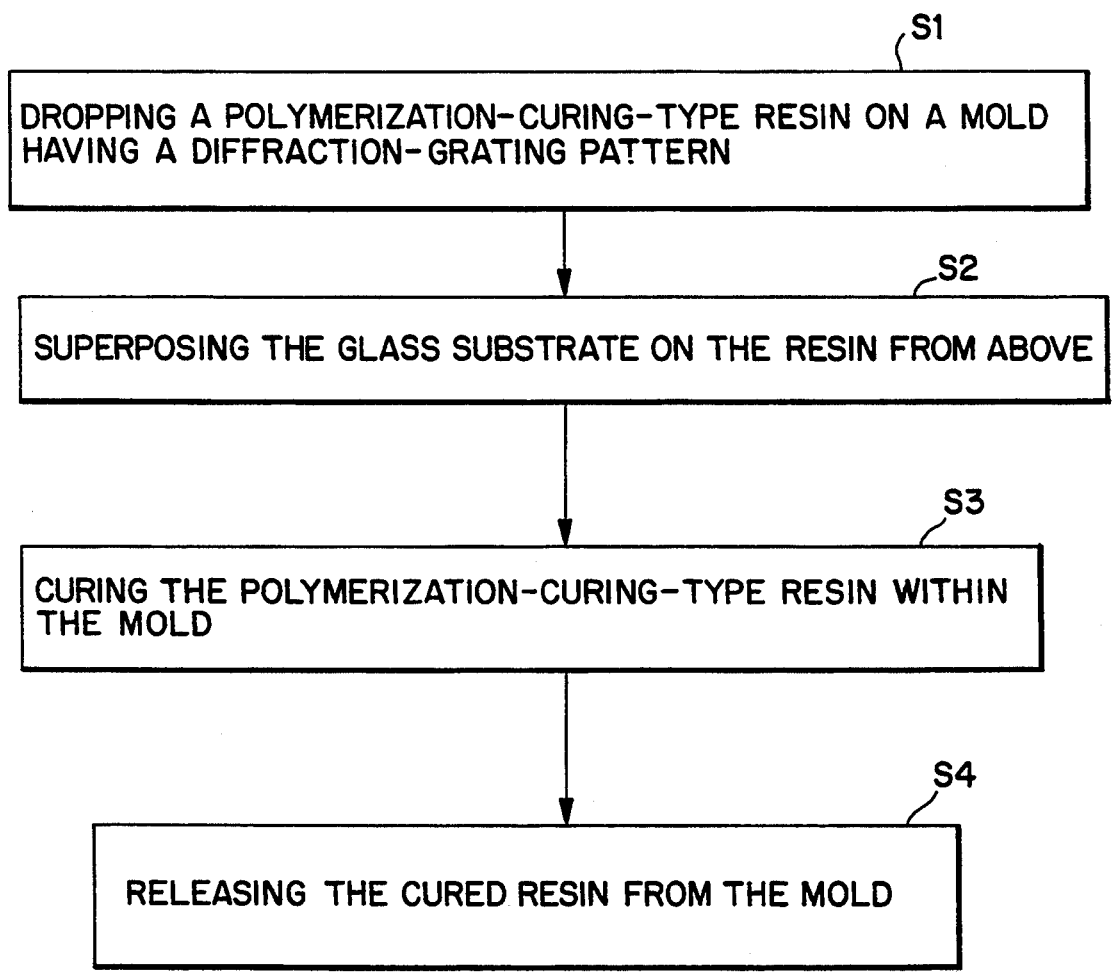
FIG. 11 illustrates a method of producing a binary or blazed diffraction grating.

Line 60, "and in FIG. 22." should read --in FIG. 11.--.

COLUMN 5

Line 14, "collected" should read --reflected--.

COLUMN 8

Line 22, "comprises" should read --is--.
Line 26, "including;" should read --including:--.
Line 60, "is" should be deleted.
Line 68, "diffracting" should read --diffraction--.

UNITED STATES PATENT AND TRADEMARK OFFICE
CERTIFICATE OF CORRECTION

PATENT NO. : 5,377,044
DATED : December 27, 1994
INVENTOR(S) : HARUO TOMONO, ET AL.

It is certified that error appears in the above-identified patent and that said Letters Patent is hereby corrected as shown below:

COLUMN 9

Line 49, "comprising;" should read --comprising:--.

Signed and Sealed this

Sixth Day of June, 1995

BRUCE LEHMAN

Commissioner of Patents and Trademarks